United States Patent [19]

Weber et al.

[11] Patent Number: 5,750,160

[45] Date of Patent: May 12, 1998

[54] NICKEL SHELL DOOR MOLDS AND METHOD OF FORMING SAME

[75] Inventors: Reinhart Weber; Robert E. Sheppard, both of Midland, Canada

[73] Assignee: Weber Manufacturing Limited, Midland, Canada

[21] Appl. No.: 693,088

[22] PCT Filed: Feb. 9, 1995

[86] PCT No.: PCT/CA95/00061

§ 371 Date: Sep. 19, 1996

§ 102(e) Date: Sep. 19, 1996

[87] PCT Pub. No.: WO95/21733

PCT Pub. Date: Aug. 17, 1995

[30] Foreign Application Priority Data

Feb. 9, 1994 [GB] United Kingdom ............... 9402471

[51] Int. Cl.⁶ .................... B29C 51/32; C23C 16/06
[52] U.S. Cl. .............. 425/290; 249/116; 264/227; 425/403; 427/135; 427/250
[58] Field of Search .................. 427/135, 250; 264/225, 227; 249/114.1, 116; 425/290, 292, 403, 470

[56] References Cited

U.S. PATENT DOCUMENTS

| | | | |
|---|---|---|---|
| 1,294,536 | 2/1919 | Roberts | 249/116 |
| 3,111,731 | 11/1963 | Breining et al. | 264/81 |
| 4,478,779 | 10/1984 | Russell et al. | 427/135 |
| 4,917,902 | 4/1990 | Slocum et al. | 425/406 |
| 5,114,641 | 5/1992 | Warburton | 425/292 |
| 5,169,549 | 12/1992 | Weber | 249/114.1 |
| 5,388,803 | 2/1995 | Baumgartner et al. | 249/116 |
| 5,407,487 | 4/1995 | Weber et al. | 118/728 |
| 5,435,956 | 7/1995 | McCrory | 425/292 |
| 5,470,651 | 11/1995 | Milinkovic et al. | 106/38.2 |
| 5,591,485 | 1/1997 | Weber et al. | 427/250 |

FOREIGN PATENT DOCUMENTS

| | | |
|---|---|---|
| 2076578 | 2/1994 | Canada . |
| 184522 | 6/1986 | European Pat. Off. . |
| 245995 | 11/1987 | European Pat. Off. . |
| 2039403 | 2/1972 | Germany . |
| 2206840 | 1/1989 | United Kingdom . |
| 94/25638 | 11/1994 | WIPO . |

*Primary Examiner*—Robert Davis
*Attorney, Agent, or Firm*—Arne I. Fors, Reg.#20,775

[57] ABSTRACT

A method of forming a nickel shell for a mold insert to reproduce an article surface, and a novel nickel shell insert are disclosed. The method comprises securing the article to be reproduced to a base having a perimeter, forming a dam about the perimeter, filling the interior of the dam with a silicone, mounting a register plate over the article within the dam in contact with the silicone, and allowing the silicone to cure whereby the silicone forms a negative master of the article surface, removing the negative master from the article and positioning a steel mandrel over the negative master to define a cavity therebetween, feeding a silicone which is not adherent to the negative master into said cavity to fill the cavity and allowing the silicone to cure whereby the silicone forms a positive master which adheres to the steel mandrel, removing the negative master from the positive master, and depositing a layer of nickel by nickel vapour deposition onto the positive master to form a nickel shell.

3 Claims, 12 Drawing Sheets

NICKEL SHELL DOOR MOLDS AND METHOD OF FORMING SAME

BACKGROUND OF THE INVENTION

1. Field of the Invention

This invention relates to a nickel vapour deposition shell mold and, more particularly, relates to a nickel shell mold and steel base composite insert ("nickel shell insert") having an authentic, textured mold surface reproduction of the original wood, leather, cloth and the like material and to the method of production of a nickel shell and a nickel shell insert.

2. Description of the Related Art

The reproduction of textured surfaces, such as wood, leather or cloth, can be obtained on nickel mold surfaces by electrodeposition of nickel onto a surface to be reproduced. However, several preliminary steps are required to prepare a master bath mold for electrodeposition. Electrodeposition of nickel then normally requires 6–8 weeks to provide the prescribed build-up of 0.8 to 1 centimeter (5/16–3/8 inch) nickel thickness. Normally the first reproduction is not acceptable due to imperfections, necessitating a repeat of the deposition process, thereby requiring a total of 10–14 weeks to produce an acceptable mold.

Plastic products such as door panels molded from steel molds with textured surface produced by photoetching normally do not appear authentic and, in fact, have the appearance of an obvious reproduction due largely to lack of definition and texture.

There accordingly is a need for a method of producing a mold which is capable of accurately reproducing the original texture of materials such as wood, leather or cloth to permit production of plastic products having an authentic, hence realistic, textured surface appearance, and for a modular shell mold insert for a mold press capable of producing products having an authentic appearance.

Nickel shells commonly are formed on aluminum alloy mandrels by nickel vapour deposition. However, nickel and aluminum have different coefficients of expansion and composites of nickel and aluminum accordingly tend to warp when cooled. Nickel vapour deposition on steel mandrels, which have essentially the same coefficient of thermal expansion, permits the deposition of a nickel shell onto a steel substrate including a hardened steel shear insert which is free of distortion such as warping when heated or cooled. The nickel shell with encapsulated steel shear insert is then mounted on a steel base to form a composite nickel shell insert having component parts with essentially the same coefficient of expansion.

SUMMARY OF THE INVENTION

Canadian Patent Application No. 2,076,578 discloses methods for the manufacture of nickel shells by vapour deposition of nickel from gaseous nickel carboxyl. The nickel shells have use as molds in the mass production of plastic articles.

In its broad aspect, the present invention relates to a novel method of producing a mold of nickel using a positive master silicone reproduction of a textured shape which allows nickel vapour deposition thereon in about 30 hours compared to 6–8 weeks for conventionally electrodeposited molds.

The method of the invention for forming a nickel shell for a mold to reproduce an article surface comprises the steps of securing the article to be reproduced to a base having a perimeter, forming a dam about the perimeter, filling the interior of the dam with a silicone, mounting a register plate over the article within the dam in contact with the silicone, and allowing the silicone to cure whereby the silicone forms a negative master of the article surface. The negative master is removed from the article and a steel mandrel is positioned over the negative master to define a cavity therebetween, a silicone which is not adherent to the negative master is fed into said cavity to fill the cavity and the silicone allowed to cure whereby the silicone forms a positive master which adheres to the steel mandrel. The negative master is removed from the positive master, and a layer of nickel is deposited by nickel vapour deposition onto the positive master, such as by the method disclosed in U.S. Pat. No. 5,169,549, to form a nickel shell having an authentic negative surface reproduction thereon.

The nickel shell insert comprises a nickel shell for forming a molded part, at least one steel shear encapsulated into the nickel shell, a steel base, and connecting means for securing the nickel shell and steel shear to the steel base to form a modular insert for use in a mold base. The nickel shell insert may have an outer peripheral shear, an inner shear, or an inner and peripheral shear. The nickel shell insert may include a plurality of spaced installation and removal rods depending from the steel base for facilitating installation of the nickel shell insert in a mold cavity, for facilitating loosening and removal of the nickel shell insert from the mold cavity, and for support of the nickel shell insert during storage.

BRIEF DESCRIPTION OF THE DRAWINGS

The method of producing nickel shell molds and nickel shell molding inserts will now be described with reference to the accompanying drawings, in which.

DESCRIPTION OF THE PREFERRED EMBODIMENTS

The description will now proceed with the production of a mold incorporating a nickel shell insert. A door model is built on a sub-base which is attached to a master model base having a dam, about 1.8 centimeters (0.7 inch) high, formed about its perimeter. A silicone such as Permagile™ MRTV 1 silicone is poured onto the door model to the height of the dam to slightly overfill the area within the dam.

A steel register plate slightly larger than the door model and having vent holes is mounted over and indexed with the master model base to define a mold cavity between the door model and the steel register plate, allowing excess silicone to escape through the vent holes.

The silicone is cured for 16-24 hours at room temperature to form a negative master having the exact shape and authentic texture of the door surface. The door is removed and a suitable release agent is then applied to the surface of the negative master.

It will be understood that although this description proceeds with reference to doors, the method of the invention can be applied to produce nickel shell molds for other products such as door and window sash, furniture, cabinet tops, coffins, ornamental drawers and the like.

The silicone negative master on the steel register plate is inverted and a steel mandrel positioned over the negative master defining a cavity preferably having a depth of not more than about 0.2 centimeter (1/16 inch) between the surfaces of the negative master and the mandrel. A pouring hole is provided in the mandrel at a corner to allow the pouring of a silicone into the cavity and at least one vent hole is provided in the mandrel in the diagonally opposite corner for the escape of air. The mold is tilted at 45° to the horizontal with the pour hole at the lowest corner and a silicone such as Permagile™ RTVS 27 HTC silicone which will not adhere to the negative master is injected through the pour hole to fill the cavity. Displaced air escapes through the upper vent hole.

The mandrel is lowered to the horizontal position upon filling of the cavity and the silicone allowed to cure for 24 hours at room temperature.

The mandrel is inverted when curing is completed, the register plate removed, and the silicone negative master peeled from the silicone positive master which remains adhered to the mandrel, exposing the reproduction of a textured door surface on the positive master.

The mandrel having the positive master surface is now subjected to nickel vapour deposition at a rate of about 0.025 centimeter (0.01 inch) per hour in a deposition chamber at a temperature of about to 177° C. (350° F.) form a nickel shell.

Figure 1:
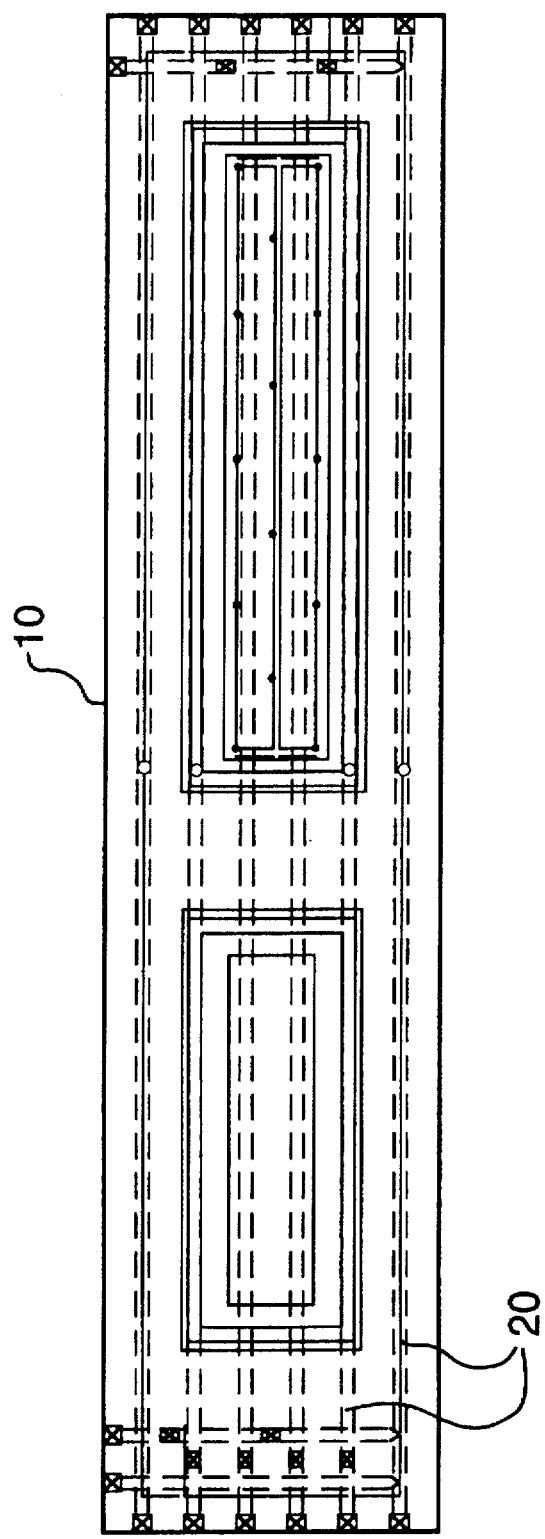
FIG. 1 is a plan view of a mandrel used to deposit a nickel shell showing internal heating and cooling lines by ghost lines.
Figure 2:
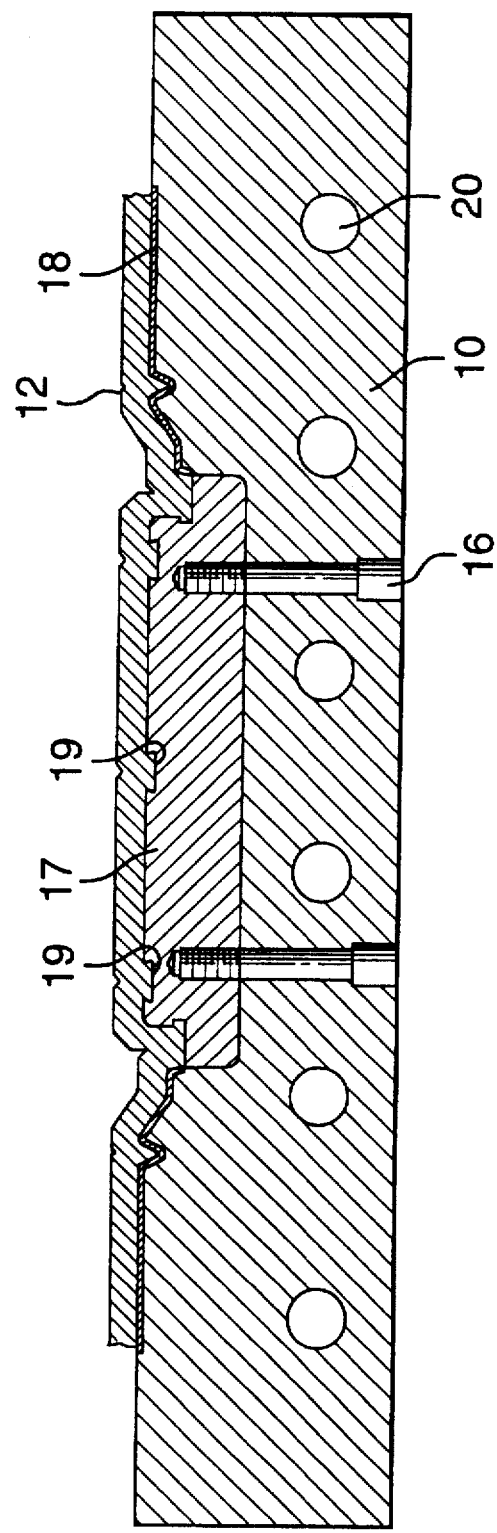
FIG. 2 is a cross-section view of the mandrel shown in FIG. 1 indicating an encapsulated hardened steel insert for an inner shear.
Figure 3:
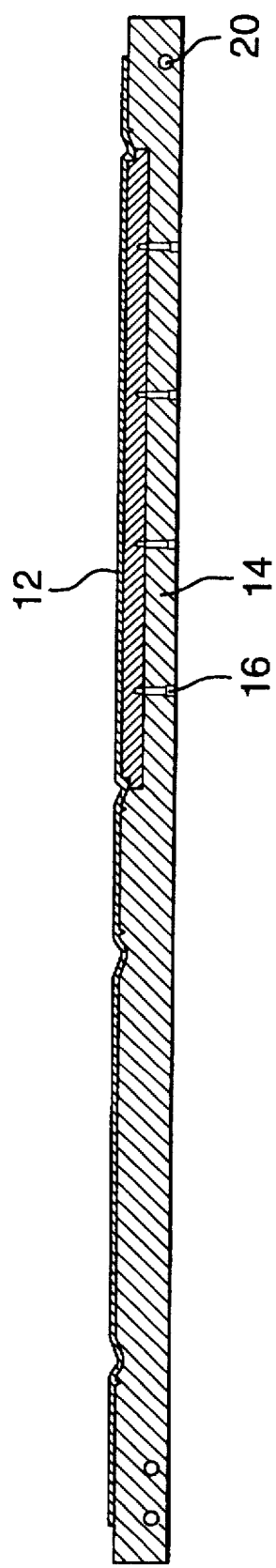
FIG. 3 is a longitudinal section of the mandrel shown in FIGS. 1 and 2.

Turning now to the drawings, FIGS. 1-3 illustrate a steel mandrel 10, comprising a nickel shell 12, hardened steel shear insert 17, and a silicone positive master 18. Steel insert 17 is secured to mandrel base 14 by threaded bolts 16. Dovetail grooves 19 are provided to encapsulate the hardened steel shear insert 17 within the nickel shell 12 during the vapour deposition process. Positive master 18 imparts the desired shape and texture to the adjacent underside, i.e. molding surface, as the nickel deposits to form nickel shell 12 replicating the surface of the positive master. Internal passageways 20 permit the flow of heating oil or superheated steam.

Figure 4:
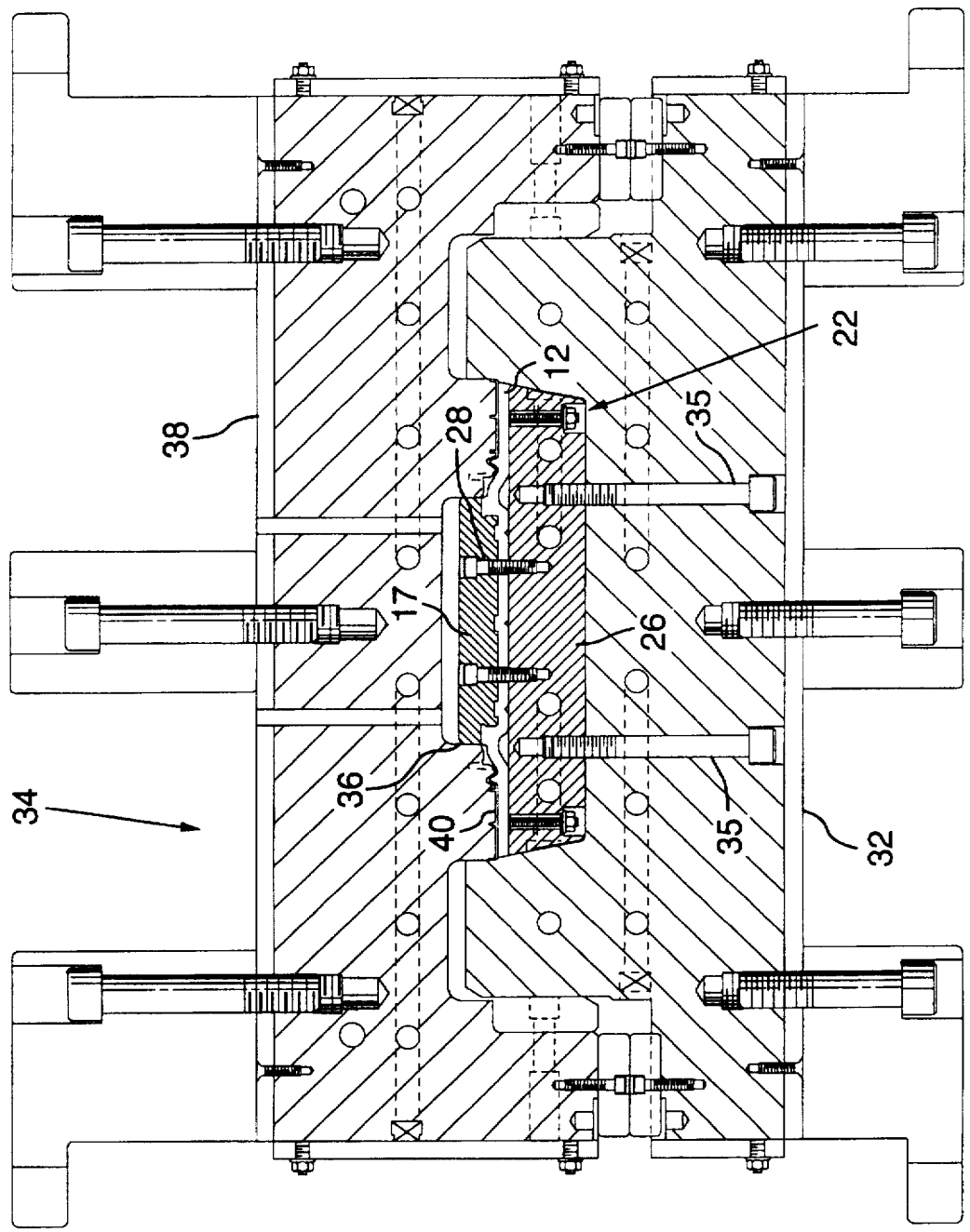
FIG. 4 is a cross-section of a mold with a nickel shell insert having an encapsulated internal shear insert for producing a door panel.
Figure 5:
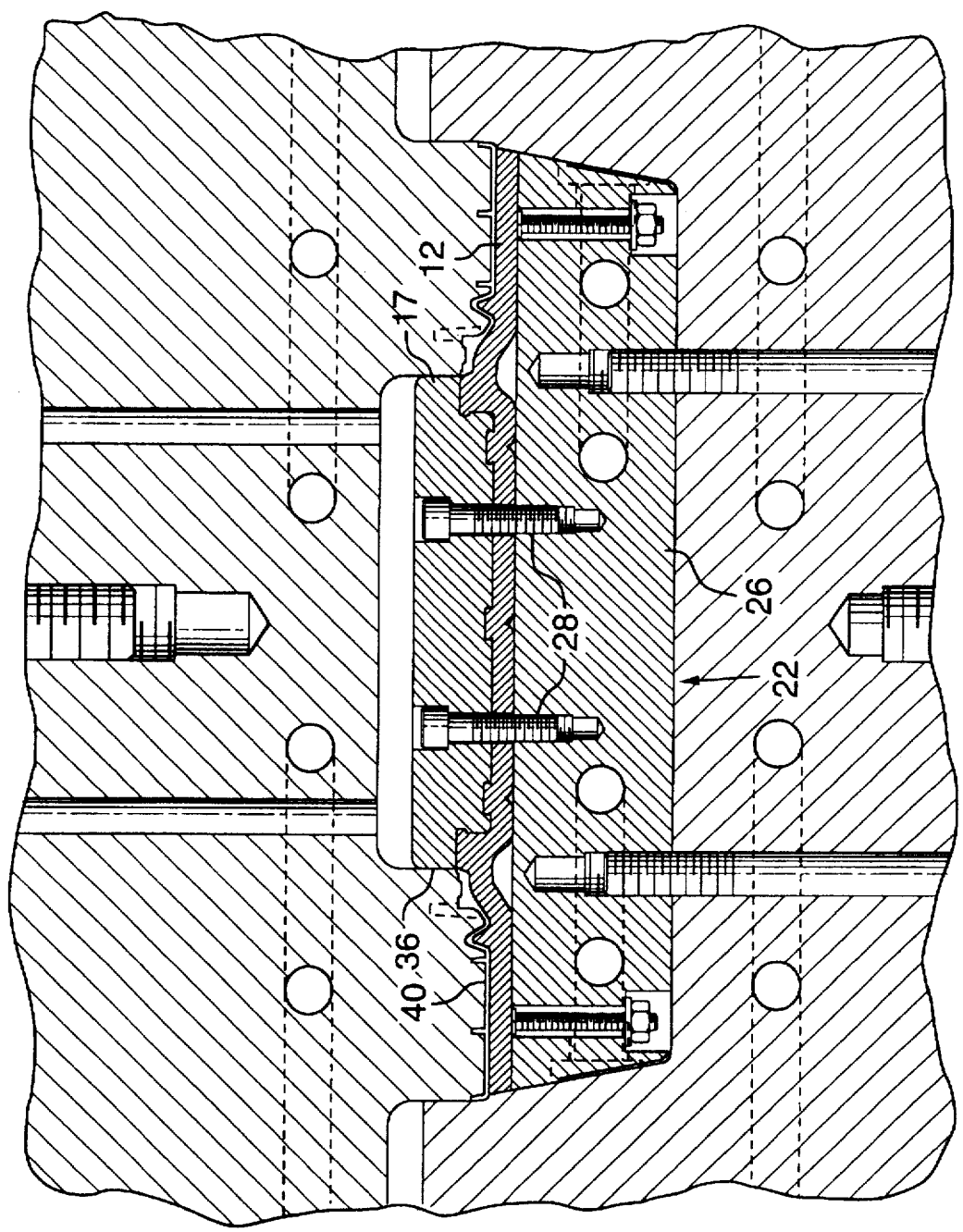
FIG. 5 is an enlarged section of the nickel shell with encapsulated internal shear insert as illustrated in FIG. 4.
Figure 6:
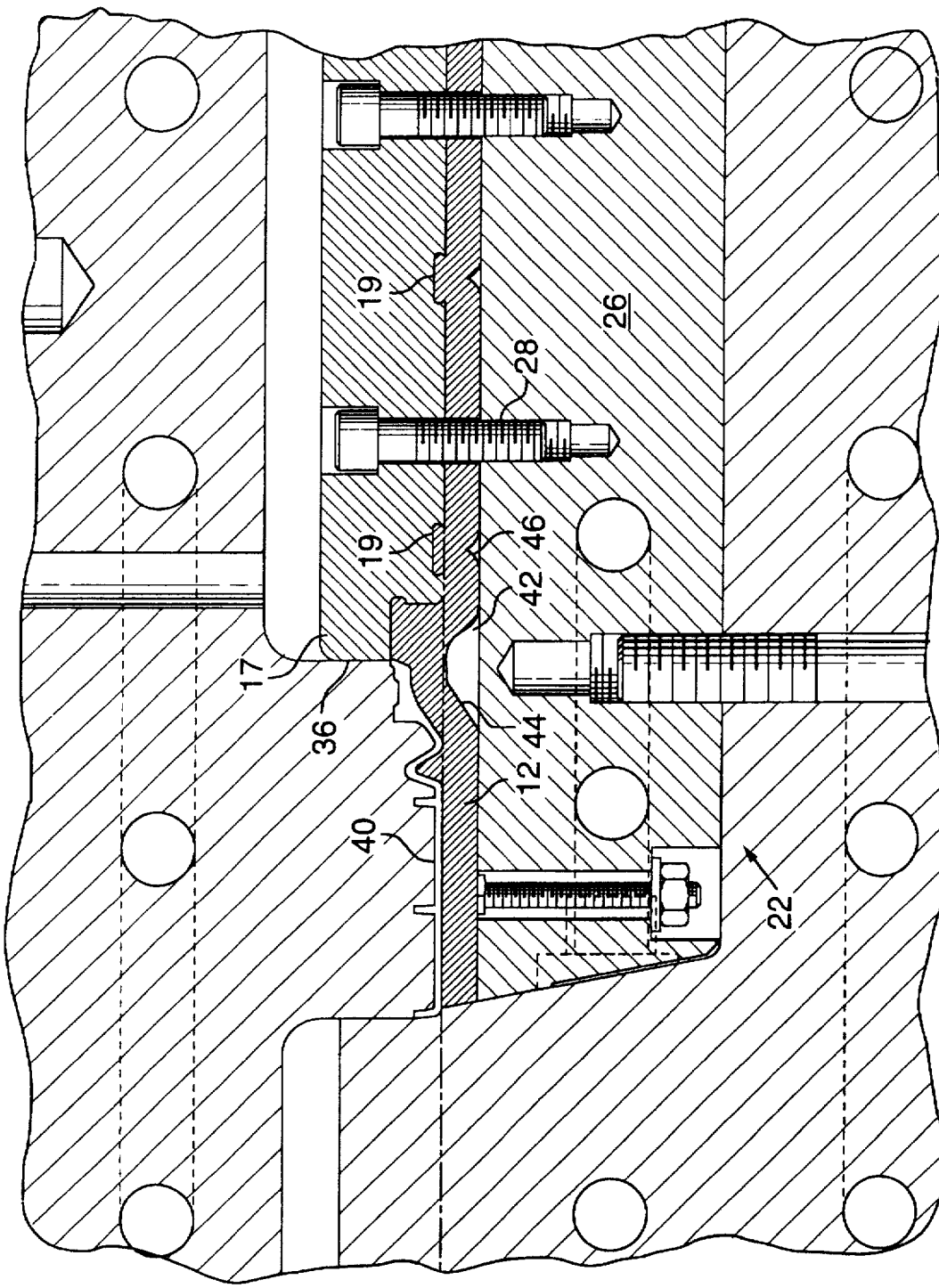
FIG. 6 is an enlarged transverse section of a portion of the mold with nickel shell insert shown in FIG. 4.

FIGS. 4-6 illustrate a mold 34 having a nickel shell insert 22 comprising nickel shell 12 and hardened steel shear insert 17, such as shown in FIG. 2, attached to steel base 26 by bolts 28 passing through hardened steel shear insert 17 and nickel shell 12 into steel base 26. Steel shear insert 17 is encapsulated by and keyed onto nickel shell 12 by dovetail grooves 19. The steel base 26 is bolted into the cavity side 32 of mold 34 by bolts 35. An inner shear 36 is defined between cavity side 32 and core side 38 by hardened steel edges of shear insert 17 to sever the inner edge of the molded part 40 of a sheet molding compound. A metal-filled epoxy 42 closes any cavities such as cavity 44 (shown more clearly in FIG. 6) formed on the back of the nickel shell to provide full support for nickel shell 12 during forming operations.

Figure 7:
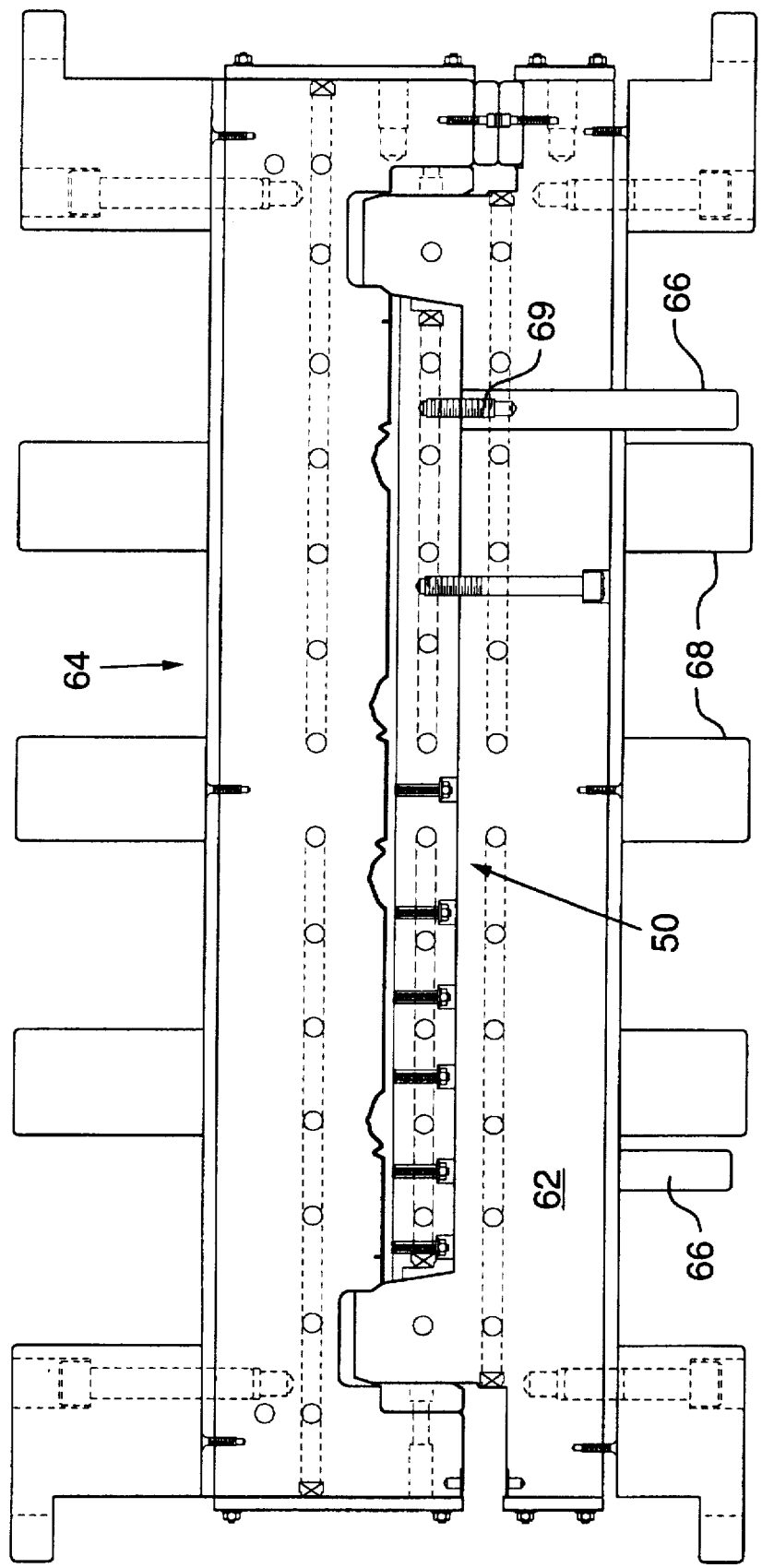
FIG. 7 is a transverse section of a mold having a nickel shell insert with an outer shear, i.e. peripheral shear, for a door.
Figure 8:
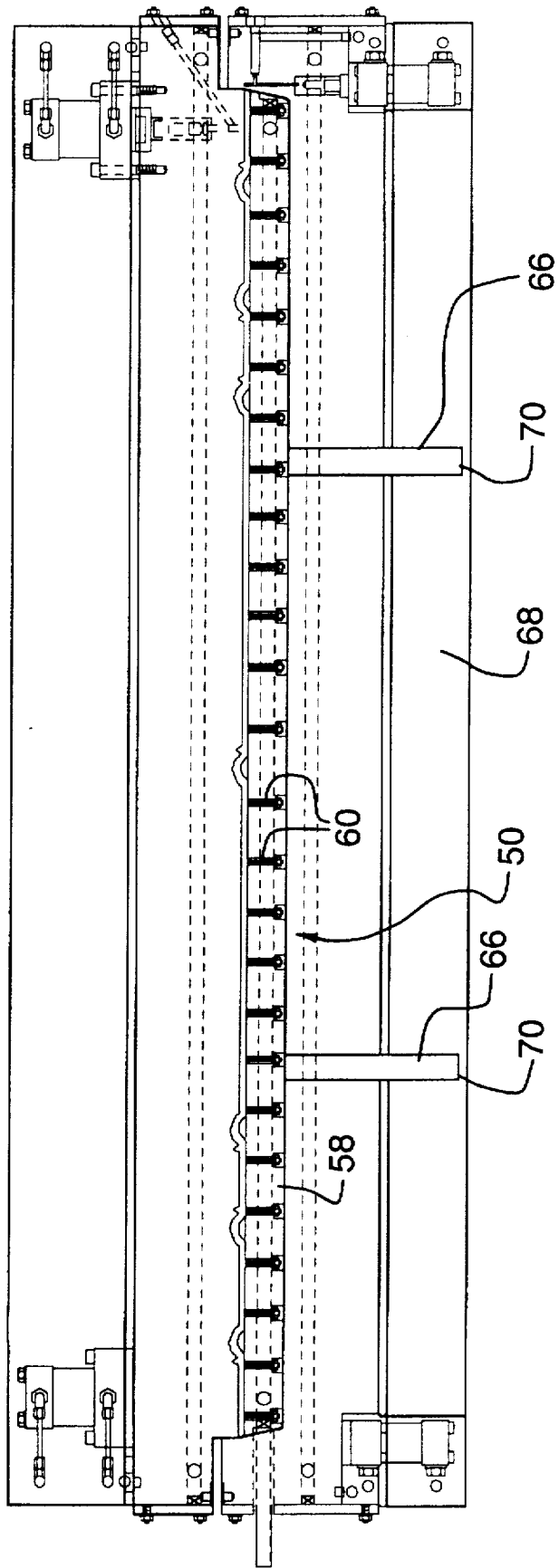
FIG. 8 is a longitudinal section of the mold having the nickel shell insert shown in FIG. 7.
Figure 9:
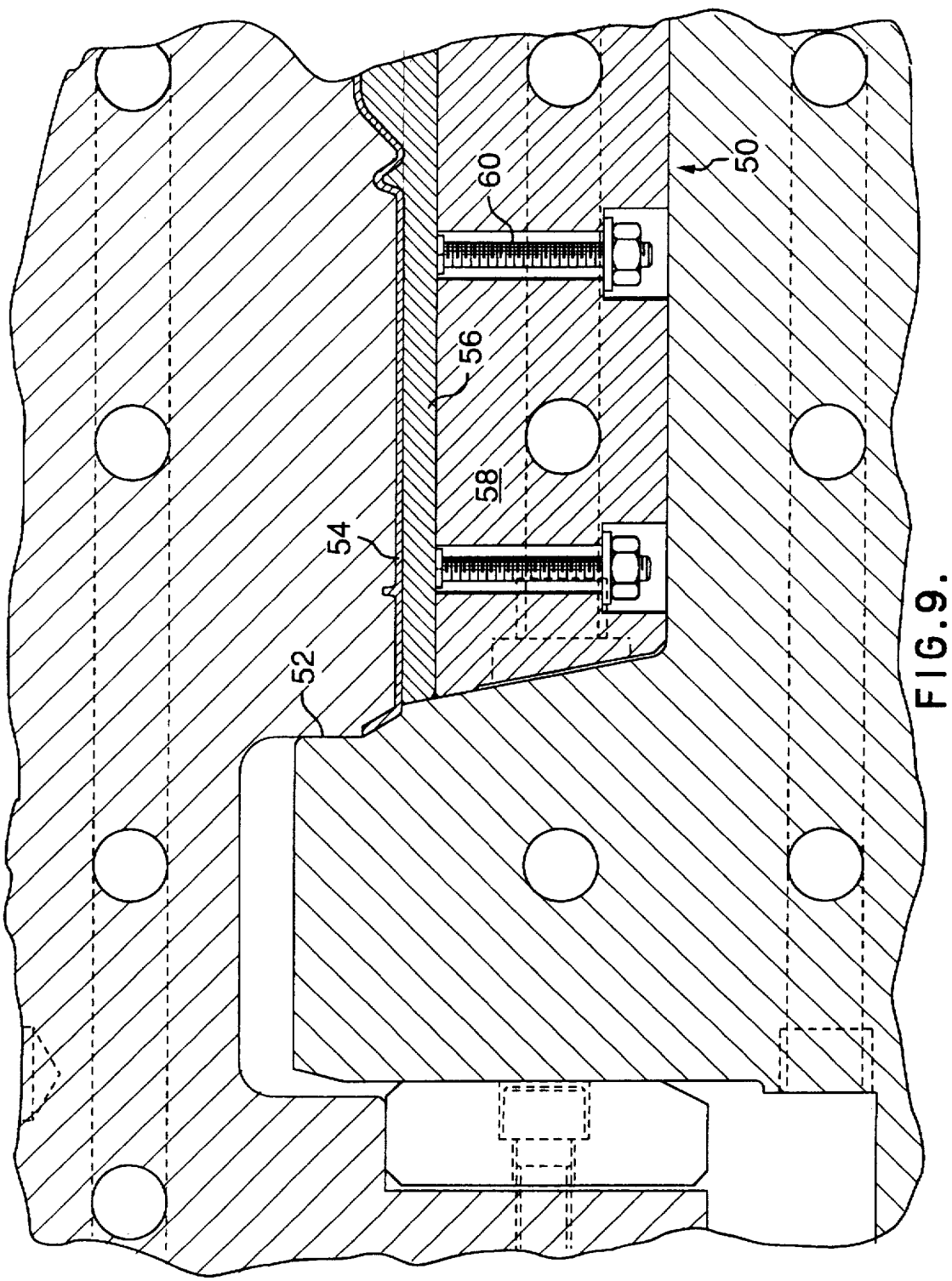
FIG. 9 is an enlarged section to the left of the mold with nickel shell insert, as viewed in FIG. 7.

FIGS. 7-9 illustrate another embodiment of a mold having a nickel shell insert 50 with an outer, peripheral shear 52 for trimming the outer edges of molded part 54, as shown most clearly in FIG. 9. Nickel shell 56 is secured to steel base 58 by a plurality of threaded studs 60 stud-welded to the back of the nickel shell 12, and which has been machined flat, equispaced longitudinally and laterally along the dimensions of the insert.

With particular reference to FIGS. 7 and 8, cavity side 62 of mold assembly 64 has a plurality of spaced installation/removal rods 66 disposed between transverse support beams 68, and secured to the nickel shell insert 50 by threaded fasteners 69 (FIG. 7). Rods 66 facilitate the installation of nickel shell insert 50 in mold cavity 62. Upon removal of support beams 68, the distal ends 70 of rods 66 take the weight of the mold insert 50 and permit the facile loosening and removal of nickel shell insert 50 from the mold assembly cavity 62 for servicing or replacement. The rods 66 also function as legs and serve to support the nickel shell insert during storage.

Figure 10:
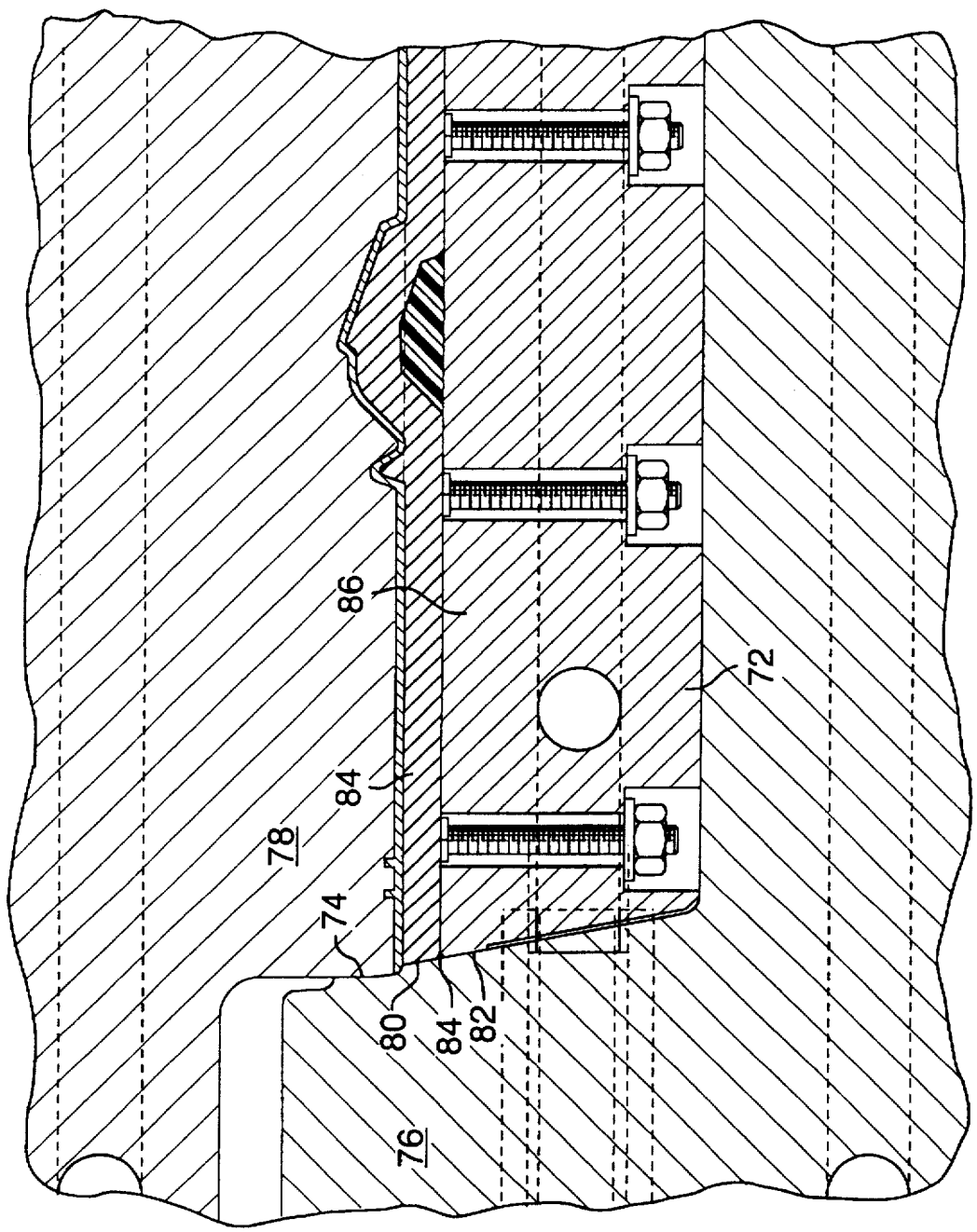
FIG. 10 is a sectional view corresponding to FIG. 9 illustrating another embodiment of a mold with a nickel shell insert with a peripheral shear.

FIG. 10 shows another embodiment of peripheral shear nickel shell insert 72 having a shear 74 between the cavity side 76 and core side 78. The co-extensive edges 80, 82 of the nickel shell 84 and steel base 86 are stitch welded at spaced intervals, or continuously welded, as typified by weld 84, to maintain the said edges together during the molding operation.

Figure 11:
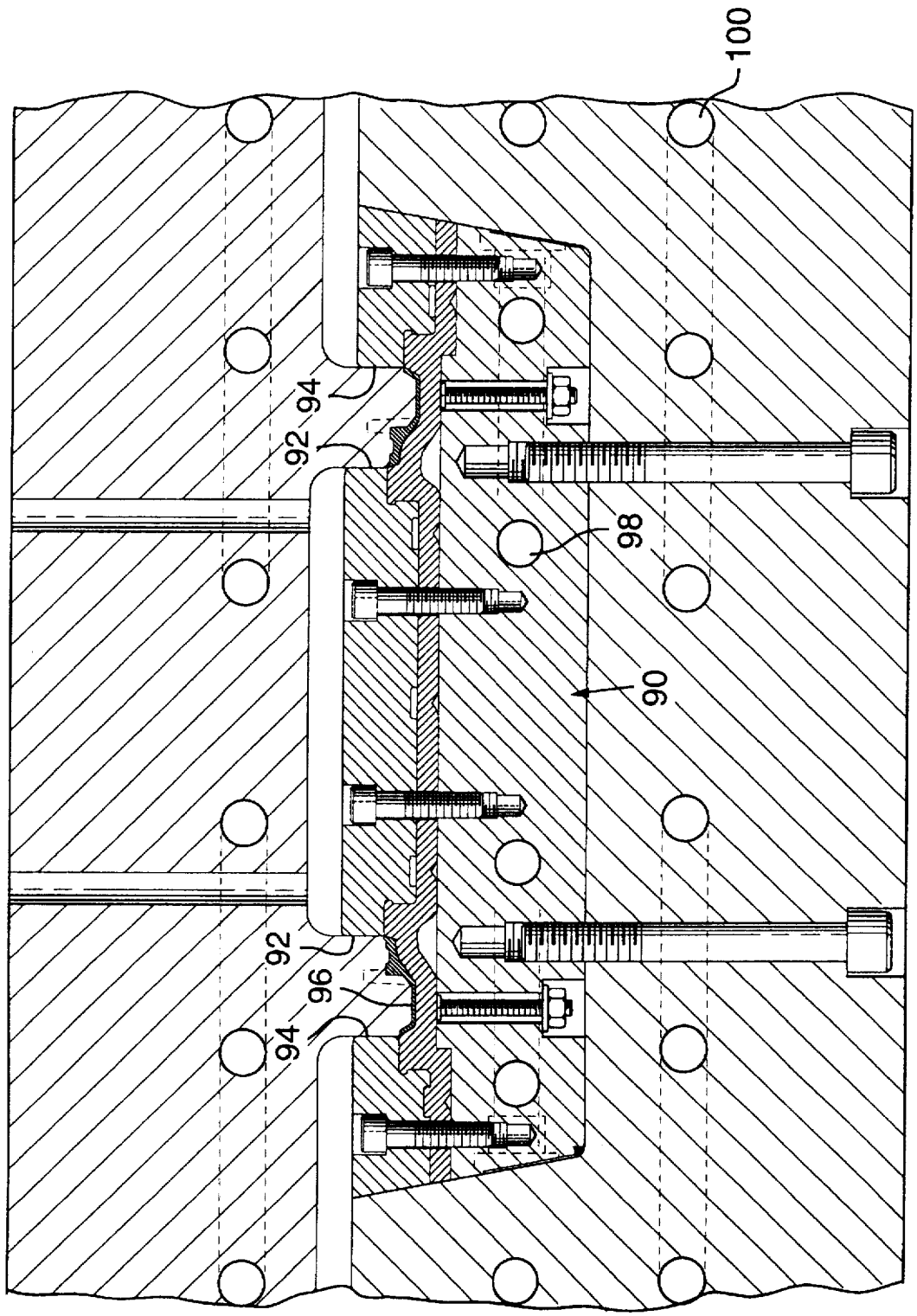
FIG. 11 is a transverse section of a portion of a mold with a nickel shell insert for inner and peripheral shear of a door panel.
Figure 12:
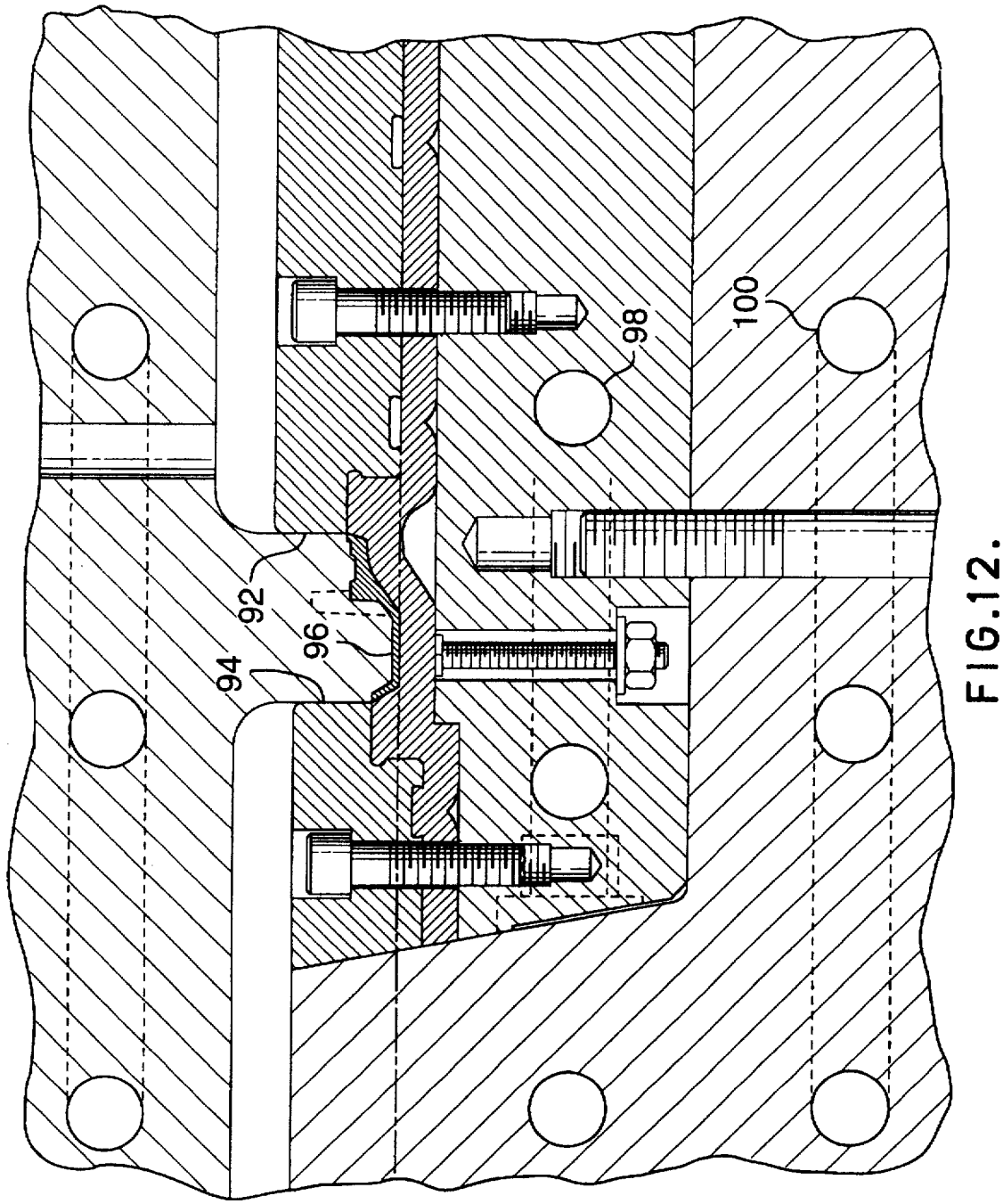
FIG. 12 is an enlarged sectional view of the inner and outer shears shown to the left as viewed in FIG. 11.

FIG. 11-12 illustrate a further embodiment of a mold having a nickel shell insert 90 having an encapsulated inner shear 92 and encapsulated outer shear 94 for trimming both sides of portions of a molded part 96 to cut out interior openings in a molded part 96. Heating passageways 98 are shown to extend through the nickel shell insert from passageways 100 in the supporting cavity side housing.

The present invention provides a number of important advantages. The method of the invention permits a relatively quick and an accurate reproduction of an original surface. The nickel shell produced by the method of the invention can be mounted on a steel base to provide a composite nickel shell-steel modular insert which can be readily replaced in a mold base. An inventory of modular nickel-shell inserts thus can provide a variety of different original and authentic textures of wood, leather, cloth and the like surfaces for use in a mold base. Replacement of material modular nickel shell inserts in both the core side and cavity side of a mold allows for production of a variety of shapes as well as textures.

We claim:

1. A method of forming a nickel shell for a mold to reproduce an article surface comprising the steps of securing the article to be reproduced to a base having a perimeter, forming a dam about the perimeter, filling the interior of the dam with a silicone, mounting a register plate over the article within the dam in contact with the silicone, and allowing the silicone to cure whereby the silicone forms a negative master of the article surface, removing the negative master from the article and positioning a steel mandrel over the negative master to define a cavity therebetween, feeding a silicone which is not adherent to the negative master into said cavity to fill the cavity and allowing the silicone to cure whereby the silicone forms a positive master which adheres to the steel mandrel, removing the negative master from the positive master, and depositing a layer of nickel by nickel vapour deposition onto the positive master to form a nickel shell.

2. A mold comprising a nickel shell produced by the method of claim 1, a steel base with encapsulated inner and outer shear inserts, and means for securing the nickel shell to the steel base to form a nickel shell insert.

3. A mold as claimed in claim 2 in which the steel base has a plurality of spaced installation and removal rods depending therefrom for facilitating installation of the nickel shell in a mold cavity, for facilitating loosening and removal of the nickel shell from the mold cavity, and for support of the nickel shell during storage.

* * * * *